United States Patent [19]

Ito et al.

[11] Patent Number: 5,547,255
[45] Date of Patent: Aug. 20, 1996

[54] RECLINING DEVICE FOR VEHICLE

[75] Inventors: Tatsuro Ito; Keiichi Oae, both of Kariya; Seijiro Shiota, Nagoya, all of Japan

[73] Assignee: Toyota Shatai Kabushiki Kaisha, Kariya, Japan

[21] Appl. No.: 363,906

[22] Filed: Dec. 27, 1994

[30] Foreign Application Priority Data

Dec. 27, 1993 [JP] Japan .................................. 5-351558
May 20, 1994 [JP] Japan .................................. 6-142126

[51] Int. Cl.⁶ ................................................... B60N 2/02
[52] U.S. Cl. .................................................... 297/367
[58] Field of Search ................................. 297/366, 367, 297/368

[56] References Cited

U.S. PATENT DOCUMENTS

| | | | |
|---|---|---|---|
| 4,457,557 | 7/1984 | Une .......................................... | 297/367 |
| 4,541,672 | 9/1985 | Fukuta et al. ............................ | 297/366 |
| 4,709,965 | 12/1987 | Kazaoka et al. ........................ | 297/366 |
| 4,732,425 | 3/1988 | Teroda et al. ............................ | 297/367 |
| 4,736,986 | 4/1988 | Kato et al. ................................ | 297/366 |
| 4,770,463 | 9/1988 | Nishino .................................... | 297/367 |
| 4,875,735 | 10/1989 | Moyer et al. ............................. | 297/366 |
| 5,247,840 | 10/1993 | Hoshihara et al. ...................... | 297/367 |
| 5,340,196 | 8/1994 | Ikegaya et al. .......................... | 297/367 |
| 5,433,507 | 7/1995 | Chang ...................................... | 297/367 |

FOREIGN PATENT DOCUMENTS

58-93254  6/1983  Japan .
63-150549 10/1988 Japan .

Primary Examiner—Peter M. Cuomo
Assistant Examiner—Anthony D. Barfield
Attorney, Agent, or Firm—Cushman, Darby & Cushman

[57] ABSTRACT

A reclining device for a vehicle includes a lower arm secured to a seat cushion of a vehicle seat, and an upper arm secured to a seat back of the vehicle seat. A ratchet plate of which an upper end is secured to the upper arm is turnably supported by the lower arm, and a base end of a pole is also turnably supported by the lower arm. A toothed edge of a lower periphery of the ratchet plate and a toothed edge of a free end of the pole are engaged and disengaged by turning the pole with a release lever. A set plate is disposed so as to face the lower arm through the ratchet plate and the pole. The set plate is supported with two shafts which respectively support the ratchet plate and the pole. The lower arm and the set plate have a flat plate-shaped configuration, respectively, and closely contact both faces of the ratchet plate and the pole, thereby preventing the ratchet plate and the pole from displacing relative to each other in a direction of thickness thereof, and ensuring engagement of the toothed edges of the ratchet plate and the pole.

6 Claims, 10 Drawing Sheets

RECLINING DEVICE FOR VEHICLE

This application claims priority from Japanese Patent applications No. Hei 5-351558, filed on Dec. 27, 1993 and No. Hei 6-142126, filed on May 20, 1994, which are incorporated herein by reference.

BACKGROUND OF THE INVENTION

1. Field of the Invention

The present invention relates to a reclining device for vehicle.

2. Description of Related Art

Figure 1:
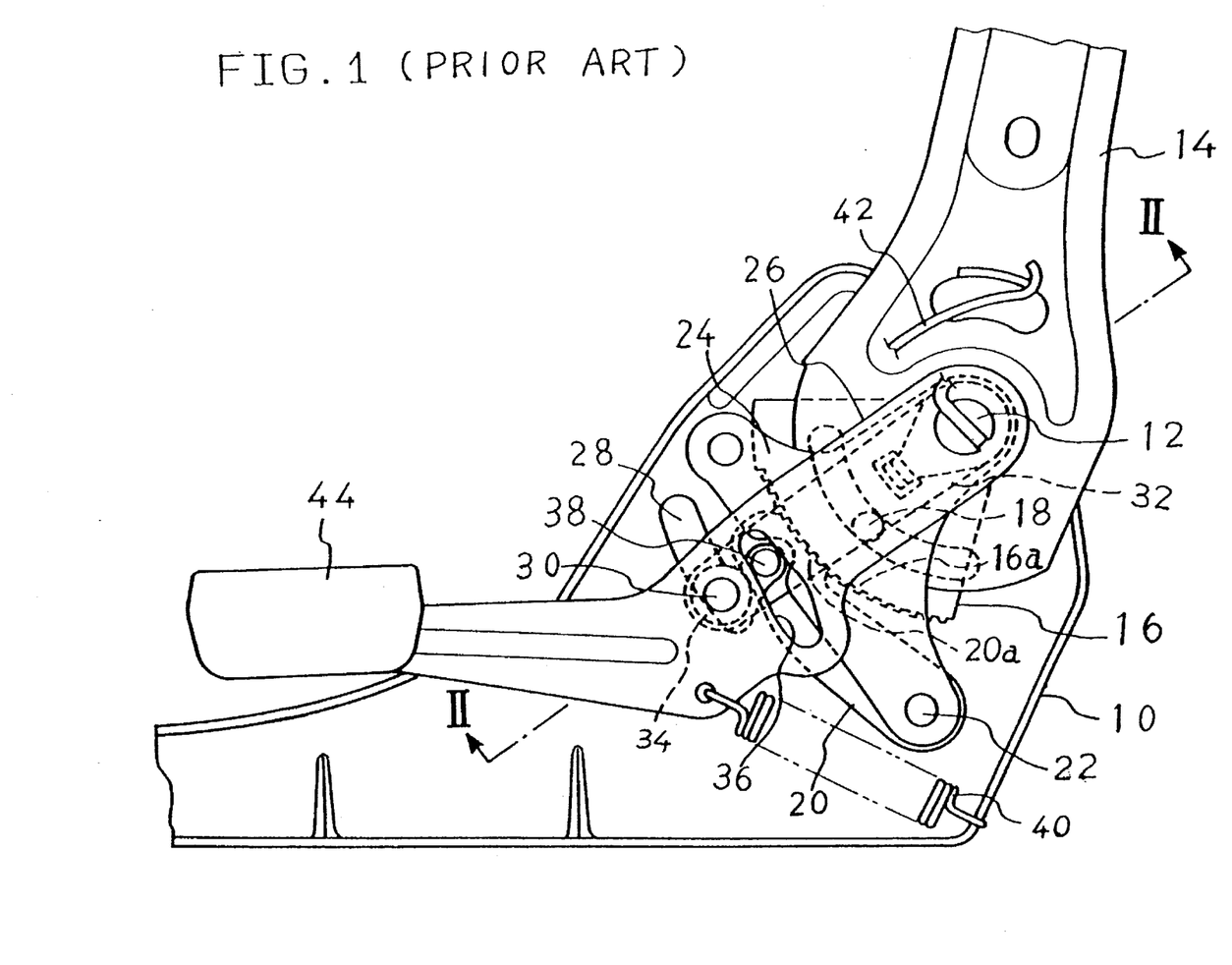
FIG. 1 is a side elevation of a conventional reclining device.
Figure 2:
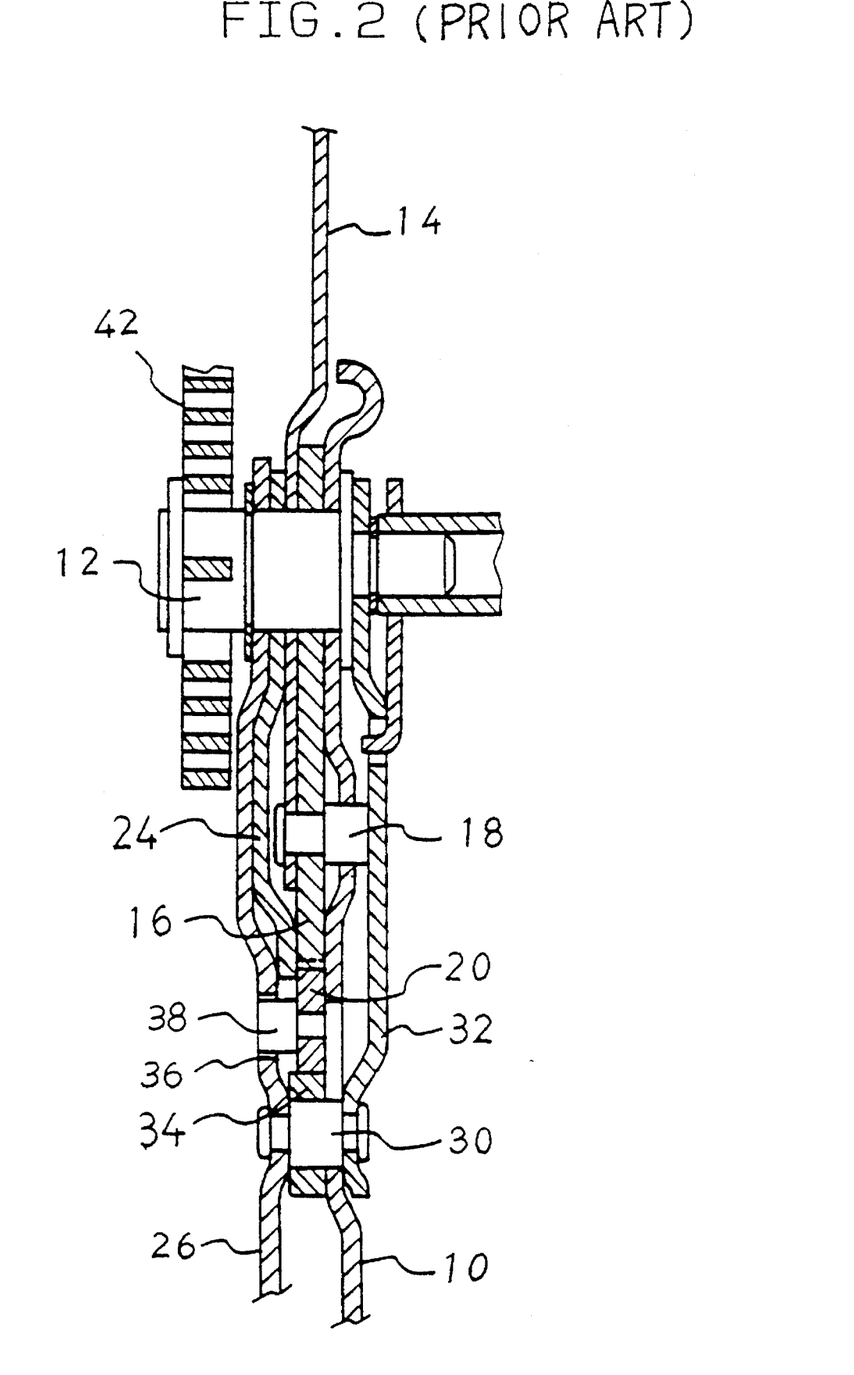
FIG. 2 is a cross-sectional view taken along the line II—II of FIG. 1.

One example of a conventional reclining device is disclosed in Japanese Utility Model application laid-open No. Sho 58-93254, and FIGS. 1 and 2 illustrate this conventional reclining device. As shown, a plate-shaped lower arm 10 is secured to a side face of a seat cushion (not shown). A rear end portion of the lower arm 10 bends upwards, and a shaft 12 is mounted thereon. An upper arm 14 is secured to a side face of a seat back frame (not shown). A lower end of the upper arm 14 is tiltably fitted on the shaft 12.

A flat ratchet plate 16 having a sector-like configuration is turnably fitted on the shaft 12 in contact with an inside face of a lower end of the upper arm 14, and is caulked on the upper arm 14 with a rivet 18. The ratchet plate 16 has a toothed edge 16a along a lower periphery thereof.

A long plate-shaped pawl 20 is turnably mounted on the lower arm 10 with a pin 22. The pawl 20 has a toothed edge 20a along an upper face of its free end. The toothed edge 20a engages the toothed edge 16a of the ratchet plate 16 to block the turn of the ratchet plate 16 and the upper frame 14 (namely, tilting of the seat back frame). A set plate 24 having a generally T-shaped configuration is secured to the lower arm 10 to hold the ratchet plate 16 and the pawl 20 with the lower arm 10. A lower edge of the lower arm 10 is secured to an upper rail (not shown) of a seat track (not shown) adapted to guide a vehicle seat frontwards and rearwards.

A release lever 26 extends along the lower arm 10. A base end of the release lever 26 is turnably fitted on the shaft 12. The lower arm 10 has a slot 28 of a generally V-shaped configuration. A guide pin 30 fitted in the release lever 26 is inserted into the slot 28, and is secured to an arm plate 32 disposed on the rear side of the lower arm 10. When the seat back is in the fixed state shown in FIGS. 1 and 2, a roller 34 provided around the guide pin 30 abuts a lower face of the free end of the pawl 20 to ensure the engagement of the toothed edges 16a and 20a. The release lever 26 has a slot 36 adjacent to the guide pin 30, and a pin 38 mounted on the pawl 20 is inserted into the slot 36.

The release lever 26 is urged counterclockwise by a coil spring 40 provided between the release lever 26 and the lower arm 10, and the upper arm 14 is urged counterclockwise by a spiral spring 42 provided between the upper arm 14 and the shaft 12.

When the seat back is reclined, a handle 44 of the release lever 26 is lifted to move the guide pin 30 along the slot 28 and separate the roller 34 from the pawl 20. By lifting the handle 44 further, the pin 38 of the pawl 20 moves to the position where the slot 36 alignes with the slot 28, and the pawl 20 separates from the ratchet plate 16. This results in the toothed edges 16a and 20a disengaging, and the upper arm 14 becoming tiltable about the shaft 12.

With the above-described conventional reclining device, the ratchet plate 16 and the pawl 20 are positioned between the lower arm 10 and the set plate 24, as shown in FIG. 2. However, the set plate 24 has an outwardly protruding configuration so as not to contact a head of the rivet 18 adapted to secure the upper arm 14 and the ratchet plate 16 to the arm plate 32. Accordingly, the set plate 24 is spaced from the ratchet plate 16 in the vicinity of the rivet 18. Furthermore, due to the scattering in the assemble positions of the pawl 22, upper arm 14, lower arm 10, set plate 24 or the like, the ratchet plate 16 is apt to displace relative to the pawl 20. As a result, engagement of the toothed edges 16a and 20a is likely to become unstable. In order to solve this defect, conventionally, the ratchet plate 16 has been made thicker than that of the other parts. This arrangement, however, has a problem of the set plate 24 further protruding outwards to increase the thickness and size of the overall reclining device.

SUMMARY OF THE INVENTION

Accordingly, it is an object of the present invention to provide a reclining device for a vehicle, which is small in thickness, compact in size, and simple in construction.

The reclining device in accordance with the present invention has a lower arm secured to a side face of a seat cushion of a vehicle seat, and an upper arm secured to a side face of a seat back of the vehicle seat. The lower arm turnably supports a center of a flat ratchet plate having a toothed edge along a lower periphery thereof. An upper end of the ratchet plate is secured to a lower end of the upper arm. The lower arm turnably supports a base end of a plate-shaped pawl having a toothed edge at a free end thereof, which is adapted to engage the toothed edge of the flat ratchet plate. The plate-shaped pawl is turned by a release lever to engage and disengage the toothed edge of the plate-shaped pawl and that of the flat ratchet plate.

When the seat back of the vehicle seat is reclined, two toothed edges are disengaged and the seat back is tilted to a desired tilting posture. Then, the two toothed edges are engaged again in the state where the seat back is tilted.

A flat set plate is disposed to hold both the flat ratchet plate and the plate-shaped pawl with the lower arm in contact with both surfaces of the flat ratchet plate and the plate-shaped pawl. The flat set plate is secured to the lower arm with a shaft which turnably supports the center of the flat ratchet plate, and is also secured to the lower arm with another shaft which turnably rotatably supports the plate-shaped pawl below the flat ratchet plate.

In the reclining device in accordance with the present invention, the flat ratchet plate is supported turnably at a center thereof, and an upper end thereof is secured to the upper arm. This arrangement enables the lower arm to closely contact both one face of the flat ratchet plate except for its upper end, and one face of the plate-shaped pawl, and also enables the flat set plate to closely contact both the other face of the flat ratchet plate except for its upper end, and the other face of the plate-shaped pawl. This can reduce the thickness of the device, and make the overall device compact.

In one preferred embodiment of a reclining device in accordance with the present invention, an extension is respectively formed in the lower arm and flat set plate so as to extend below the lower end of the flat ratchet plate. The resulting extensions are joined together to form an upper rail of a seat track which is adapted to guide the vehicle seat frontwards and rearwards.

With the present preferred embodiment where the upper rail is formed by using the lower arm and the flat set plate, the construction of the device is made simple. Furthermore, since the upper rail is composed by joining the lower arm and the flat set plate together, the strength is improved.

In another preferred embodiment of a reclining device in accordance with the present invention, a flange is formed along an upper peripheray of the lower arm so as to surround the flat ratchet plate. With this arrangement, when the flat ratchet plate turns and the toothed edge thereof faces upwardly, the toothed edge is covered with the flange of the lower arm, and protected thereby. So, there is no need to attach a resin cover or the like to the lower arm.

In still another preferred embodiment, the upper end of the flat ratchet plate is connected to the upper arm with a connecting pin such that the connecting pin is slidably inserted into an arc-shaped slot formed in the lower arm which is disposed between the flat ratchet plate and the upper arm. In this case, the upper end portion of the flat ratchet plate is formed to have a configuration capable of covering the arc-shaped slot of the lower arm during the turn of the flat ratchet plate. With this arrangement, dirt or other undesirable things can be prevented from entering the arc-shaped slot.

In a further preferred embodiment, the lower arm, upper arm and flat ratchet plate are secured together with the following arrangement: namely, an extension is formed in the upper end of the flat ratchet plate so as to extend above the upper end of the lower arm, and the resulting extension is secured to the upper arm. Another extension is formed in the lower end of the upper arm so as to extend toward the shaft which turnably supports the center of the flat set plate, and is turnably supported by this shaft. With this arrangement, both the flat ratchet plate and the upper arm turn about the common shaft, and accordingly, the lower arm, upper arm and flat ratchet plate are secured together with a simple arrangement.

Other objects, features and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 3:
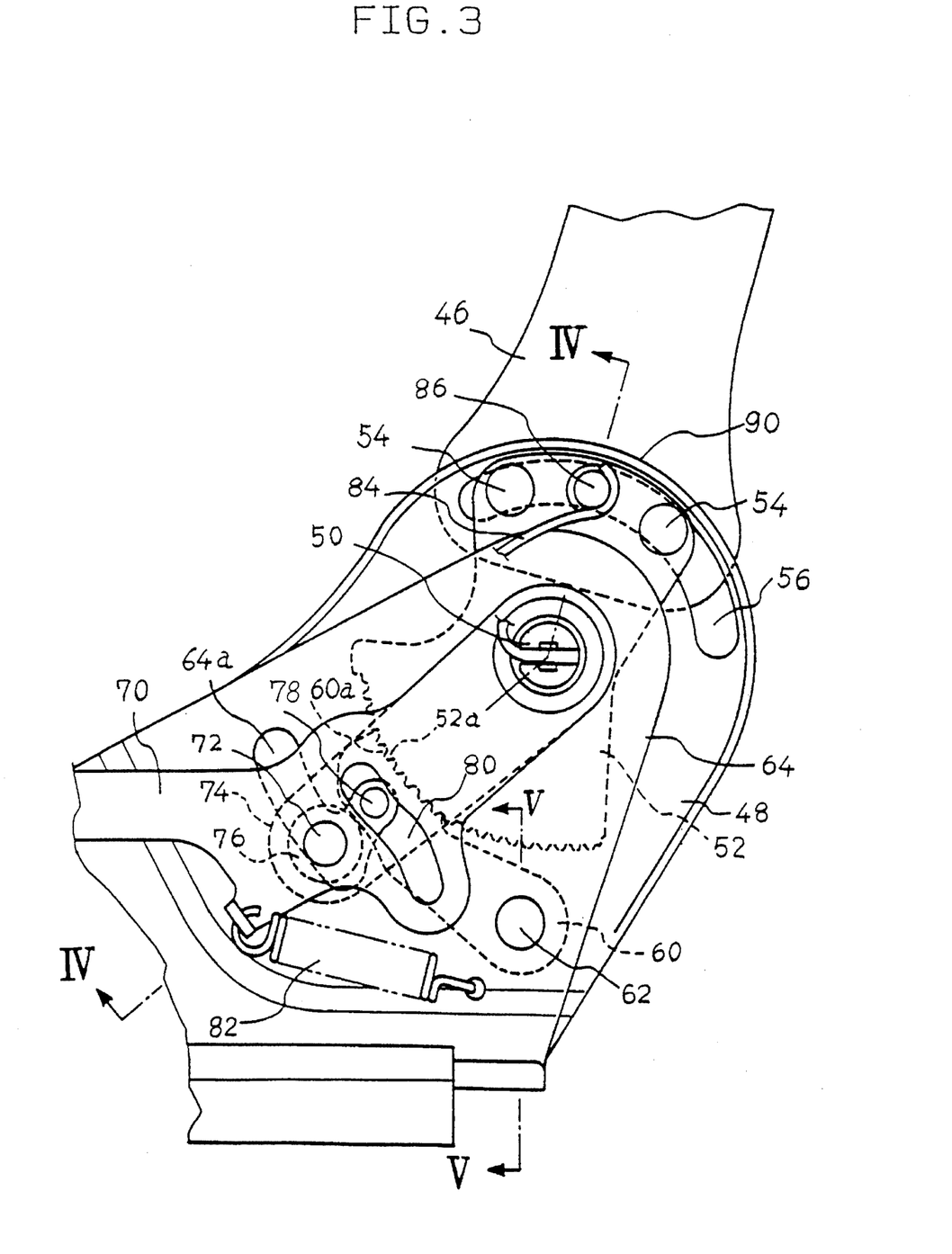
FIG. 3 is a side elevation of a main part of a first embodiment of a reclining device in accordance with the present invention.
Figure 4:
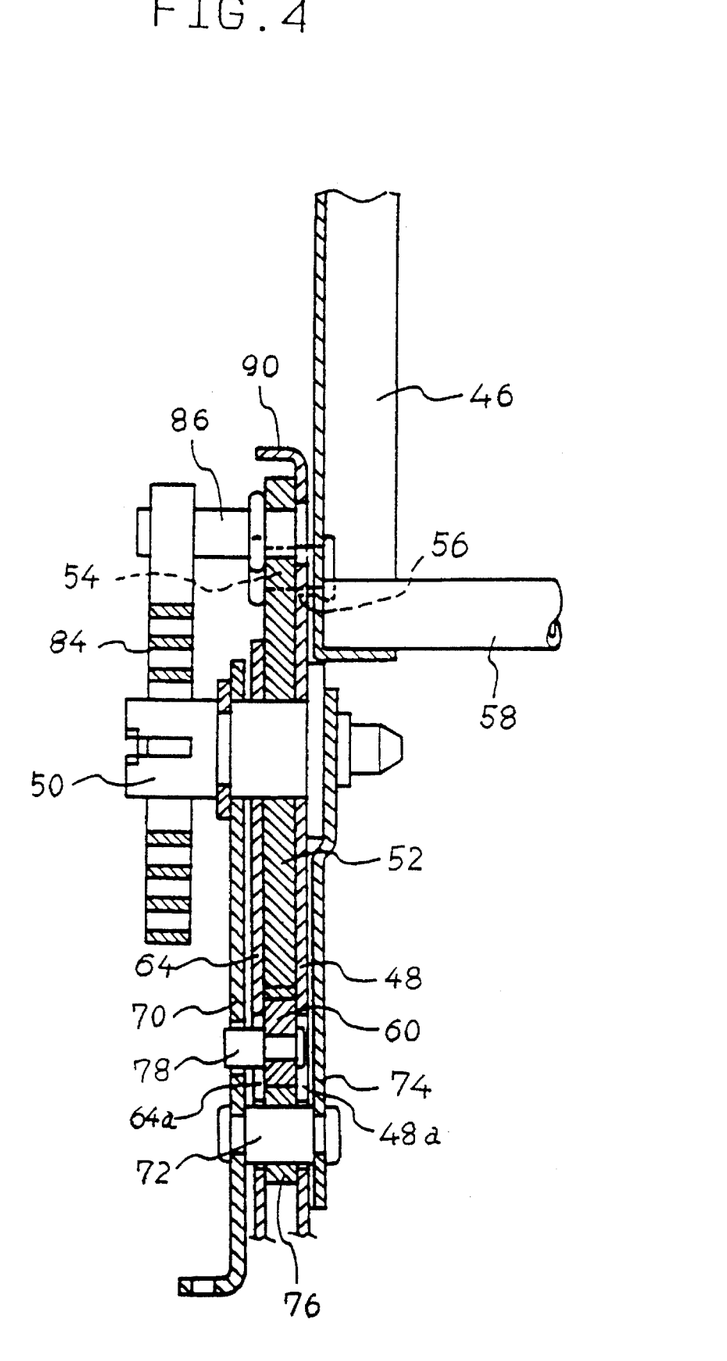
FIG. 4 is a cross-sectional view taken along the line IV—IV of FIG. 3.
Figure 5:
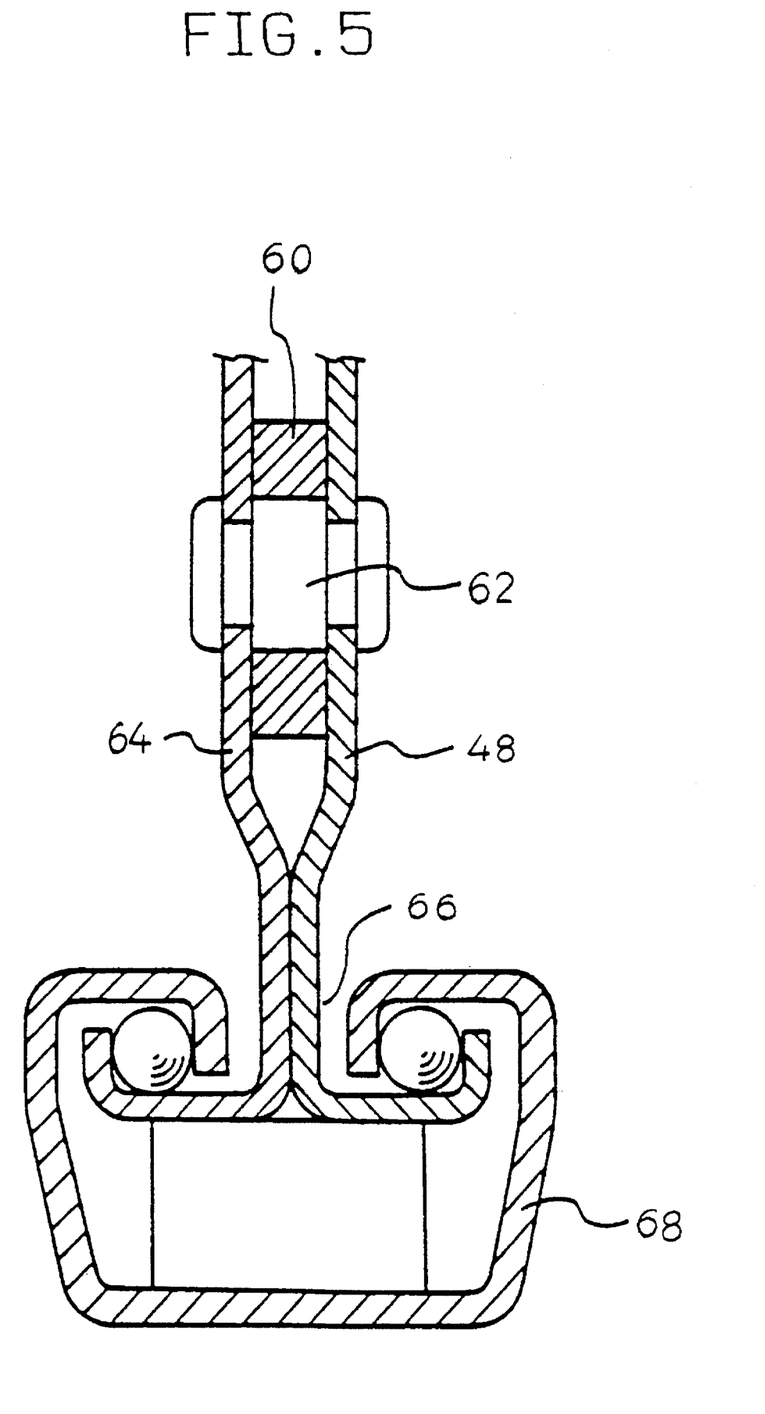
FIG. 5 is a cross-sectional view taken along the line V—V of FIG. 3.

FIGS. 3, 4 and 5 illustrate a first embodiment of a reclining device in accordance with the present invention. As shown, an upper arm 46 extends along a side face of a seat back (not shown), and a lower arm 48 extends along a side face of a seat cushion (not shown). A shaft 50 is mounted on a rear end portion of the lower arm 48, and a ratchet plate 52 is turnably fitted on the shaft 50. The lower part of the ratchet plate 52 has a generally sector-shaped configuration, and is provided with toothed edge 52a along a periphery thereof. The upper part of the ratchet plate 52 gradually widens upwards, and is caulked on the upper arm 46 with rivets 54 at two positions along an upper periphery thereof. An upper end portion of the lower arm 48 is disposed between the ratchet plate 52 and the upper arm 46. An arc-shaped slot 56 is formed along the upper periphery of the lower arm 48. The rivets 54 are located slidably within the arc-shaped slot 56. The upper arm 46 is connected integrally to a pipe frame 58 of the seat back (FIG. 4).

A pawl 60 having a long plate-shaped configuration is disposed below the ratchet plate 52. A base end of the pawl 60 is supported turnably by a pin 62 which is disposed through both the lower arm 48 and the set plate 64 (FIG. 5). Toothed edge 60a is formed along an upper face of a free end of the pawl 60, and engage the toothed edge 52a of the ratchet plate 52. A set plate 64 is disposed parallel to the lower arm 48. The ratchet plate 52 except for its upper end, and the pawl 60 are disposed between the lower arm 48 and the set plate 64 in contact therewith. The ratchet plate 52 and the pawl 60 are slidably held between the lower arm 48 and the set plate 64.

The set plate 64 has a substantially identical configuration to that of the lower arm 48 except for its upper end portion. As shown in FIG. 5, the set plate 64 and the lower arm 48 are welded and lower ends thereof are bent in opposite directions into an inverted T-shaped cross-section to form an upper rail 66 of a seat track. The resulting upper rail 66 is slidable along a lower rail 68 of a generally U-shaped cross-section through balls or rollers.

A release lever 70 is provided along a side face of the seat cushion parallel to the set plate 64. A rear end portion of the lever 70 bends obliquely upwards and fitted on the shaft 50. The release lever 70 is secured to an arm plate 74 which is disposed on a rear side of the lower arm 48 with a guide pin 72. The lower arm 48 and the set plate 64 respectively have generally V-shaped slots 48a and 64a of an identical configuration. The guide pin 72 is inserted into one side (left side in FIG. 3) of the slots 48a and 64a. A roller 76 is provided around the guide pin 72 at a position between the lower arm 48 and the set plate 64, and abuts a lower face of the free end of the pawl 60 to push the pawl 60 toward the toothed edge 52a of the ratchet plate 52. The arm plate 74 is turnably fitted on the shaft 50.

A pin 78 is mounted on the free end of the pawl 60, and extends through the slots 48a and 64a and is inserted into a slot 80 formed in the release lever 70. The slot 80 extends along the lower peripheral edge of the ratchet plate 52, and a lower end of the slot 80 bends in a direction away therefrom.

The release lever 70 is urged counterclockwise by a coil spring 82 provided between the relese lever 70 and the set plate 64. The ratchet plate 52 and the upper arm 46 which is integral with the ratchet plate 52 are urged couterclockwise by a spiral spring 84 provided between a pin 86 which is mounted on an upper end of the ratchet plate 52, and the shaft 50.

As shown in FIG. 4, the edge of the lower arm 48 except for its lower end portion is bent on the side of the ratchet plate 52 to form a protection flange 90 of a width greater than the thickness of the ratchet plate 52.

When the release lever 70 is lifted to recline the seat back, the guide pin 72 moves along the one side of the slots 48a and 64a to separate the roller 76 from the lower face of the pawl 60. When the release lever 70 is lifted further, the pin 78 of the pawl 60 slides downwards along the slot 80 to cause the pawl 60 to turn in a direction away from the ratchet plate 52, thereby disengaging the toothed edge 60a of the pawl 60 and the toothed edge 52a of the ratched plate 52. As a result, the upper arm 46 becomes tiltable about the shaft 50.

With the present embodiment, the ratchet plate 52 except for its securing part to the upper arm 46, and the pawl 60 contact both the lower arm 48 and the set plate 64 to be positioned therebetween with certainty. This arrangement prevents the ratchet plate 52 and the pawl 60 from displacing relative to each other in the direction of thickness thereof, and enables complete engagement of the toothed edges 52a and 60a. Furthermore, since both the lower arm 48 and the set plate 64 are composed of flat plates having no protrusion, the overall reclining device becomes thin and small. Additionally, since the ratchet plate 52 and the pawl 60 do not displace relative to each other, as described above, the thickness of these members can be reduced. Since the lower arm 48 and the set plate 64 are joined together to form the upper rail 66 of the seat track, the construction can be made simple and the strength of the upper rail 66 is also improved, as compared with the conventional construction wherein a lower arm is secured to an upper rail.

Furthermore, since the protection flange 90 is formed along a periphery of the lower arm 48, the toothed edge 52a of the ratchet plate 52 is covered with and protected by the protection flange 90 when the ratchet plate 52 turns and the toothed edge 52a faces upwardly to be exposed from the set plate 64. This arrangement does not require a resin protection cover which has been required to cover an upper surface of the lower arm of the conventional reclining device.

Figure 6:
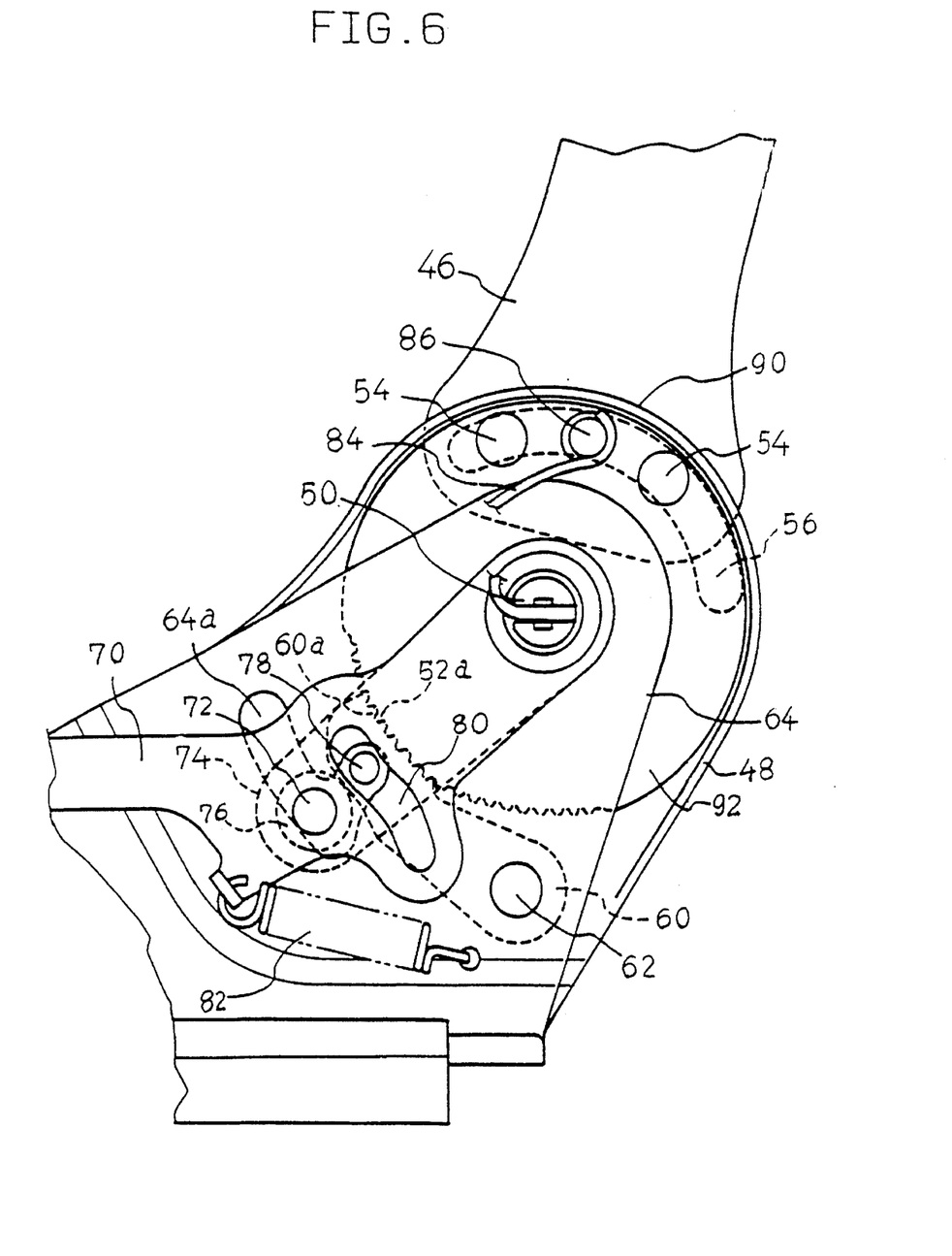
FIG. 6 is a side elevation of a main part of a second embodiment of a reclining device in accordance with the present invention.

FIG. 6 illustrates a second embodiment of the present invent ion. As shown, a ratchet plate 92 has a circular configuration and is turnably fitted on a shaft 50. Toothed edge 92a is provided in a lower part or the ratchet plate 92 so as to engage a toothed edge 60a of a pawl 60. The ratchet plate 92 has a diameter capable of covering a slot 56 of a lower arm 48. The remainder of the construction of the device of the second embodiment is substantially identical to that of the first embodiment. In FIG. 6, parts similar to those in FIGS. 3 through 5 are given the same reference numerals as in these drawings.

With the second embodiment, when the ratchet plate 92 turns with the tilting of the upper arm 46, the slot 56 of the lower arm 48 is always covered with the ratchet plate 92. This effectively prevents dirt or other undesirable things from entering the slot 56.

Figure 7:
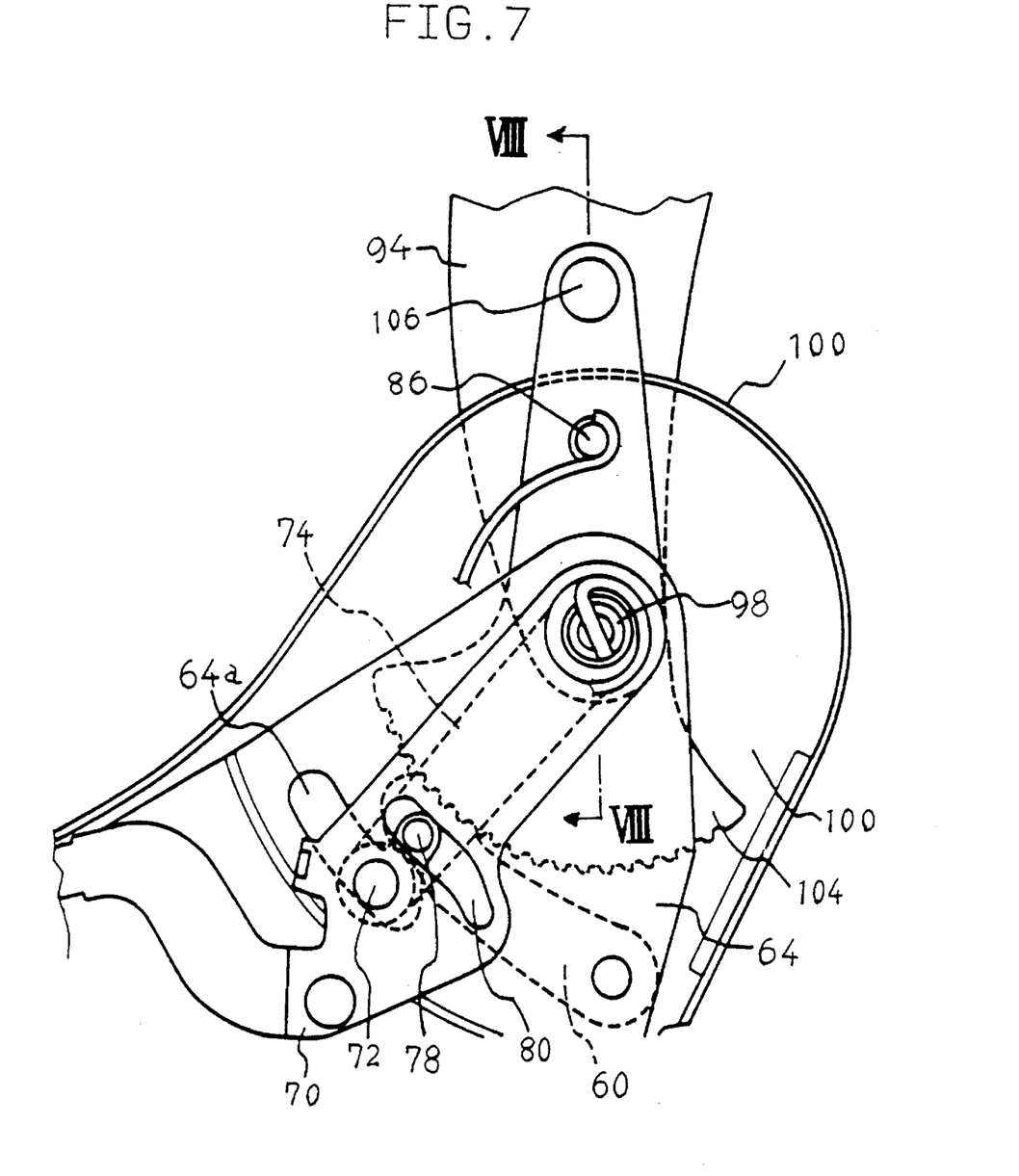
FIG. 7 is a side elevation of a main part of a third embodiment of a reclining device in accordance with the present invention.
Figure 8:
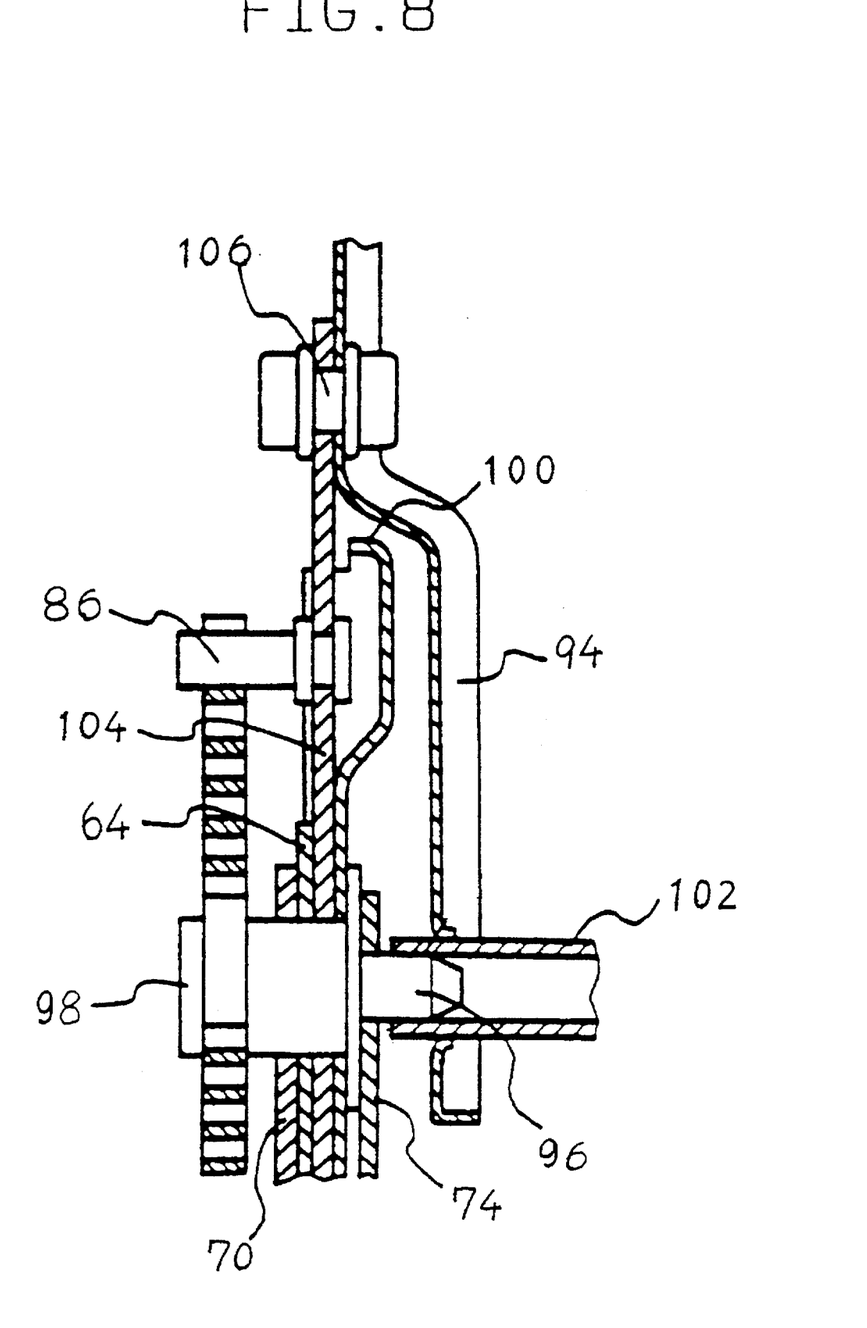
FIG. 8 is a cross-sectional view taken along the line VIII—VIII of FIG. 7.

FIGS. 7 and 8 illustrate a third embodiment of the present invention. As shown, a lower end portion of an upper arm 94 protrudes inwardly (righwards in FIG. 8). A pipe frame 102 is secured to the inwardly protruding lower end portion of the upper arm 94 and is turnably fitted on a base end 96 of a shaft 98, which projects inwardly from a rear face of a lower arm 100. A ratchet plate 104 extends above an upper end of the lower arm 100, and is secured to the upper arm 94 with a rivet 106.

The remainder of the construction of the device of the third embodiment is substantially identical to that of the first embodiment. In FIGS. 7 and 8, parts similar to those in FIGS. 3 through 5 are given the same reference numerals as in these drawings.

With the third embodiment, the upper arm 94 is held with both the shaft 98 (through the pipe 102) and the rivet 106, and is tilted about the shaft 98 integrally with the ratchet plate 104. With this arrangement, a plurality of rivets are not needed so that both the assembling steps and parts of the device can be reduced.

Figure 9:
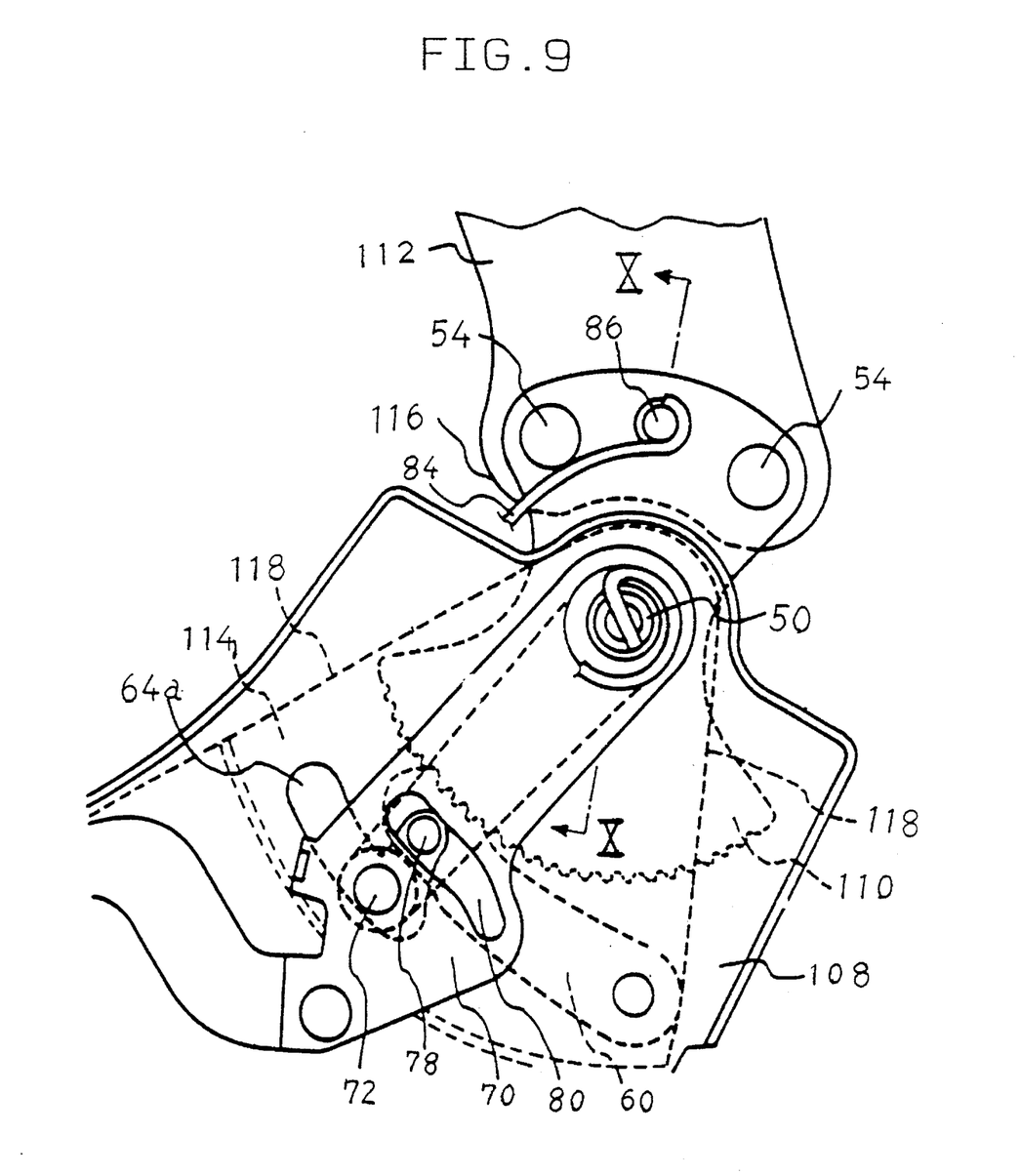
FIG. 9 is a side elevation of a fourth embodiment of a reclining device in accordance with the present invention.
Figure 10:
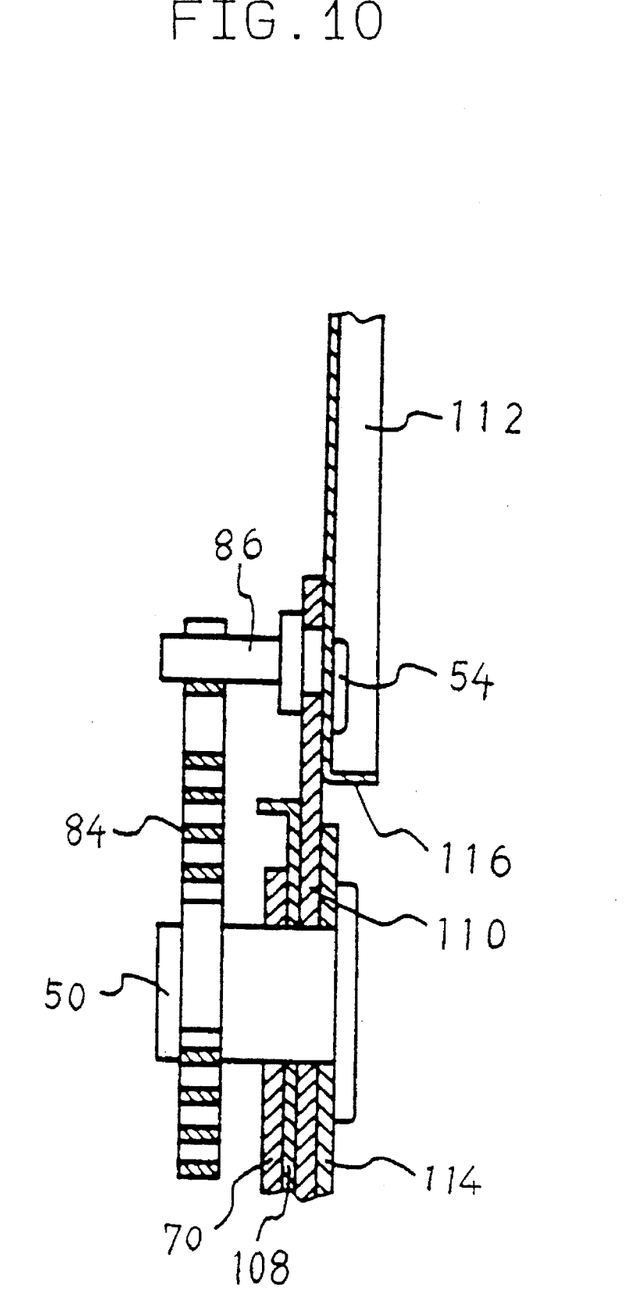
FIG. 10 is a cross-sectional view taken along the line X—X of FIG. 9.

FIGS. 9 and 10 illustrate a fourth embodiment of the present invention. As shown, an upper end portion of a lower arm 108 has a width capable of covering the turnable range of a ratchet plate 110. The lower arm 108 does not extend to the securing part of the ratchet plate 110 to an upper arm 112. A set plate 114 is disposed inside the lower arm 108. A flange 116 is formed along a lower edge of the upper arm 112. The remainder of the construction of the fourth embodiment is substantially identical to that of the first embodiment. In FIGS. 9 and 10, parts similar to those in FIGS. 3 through 5 are given the same reference numerals as in these drawings.

With the present embodiment, when the upper arm 112 is turned and tilted, the flange 116 of the upper arm 112 abuts side faces 118 (FIG. 9) of the set plate 114 to limit the tilting movement of the upper arm 112. In addition, as described above, the lower arm 108 can be made short, and accordingly, the weight of the overall device can be made small and the production costs can be reduced.

As described above, with the present invention, the reclining device for a vehicle can be made thin and small. Furthermore, the ratchet plate and the pole can be surely engaged with each other, and dirt or the like can be prevented from entering the operating parts of the reclining device.

While the invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A reclining device for vehicle comprising:

a lower arm;

an upper arm, a flat ratchet plate having opposing surfaces and a center portion that is rotatably supported by said lower arm, and an upper end secured to said upper arm, said flat ratchet plate having a toothed edge along a lower periphery thereof;

a plate-shaped pawl having a base end that is rotatably supported by said lower arm, and a free end having a toothed edge adapted to engage said toothed edge of said flat ratchet plate, said plate-shaped pawl being rotatable by a release lever to engage and disengage said toothed edge of said plate-shaped pawl and said toothed edge of said flat ratchet plate; and a flat set plate adapted to hold said flat ratchet plate and said plate-shaped pawl with said lower arm in contact with both surfaces of said flat ratchet plate and said plate-shaped pawl, said flat set plate being secured to said lower arm with two shafts, one of said shafts being adapted to rotatably support said center portion of said flat ratchet plate at an upper end of said flat set plate, and the other of said shafts being adapted to rotatably support said base end of said plate-shaped pawl at a position below said flat ratchet plate, and said lower arm and said flat set plate closely contacting a respective surface of said flat ratchet plate except for connecting parts to said upper arm, and said plate-shaped pawl so as to be slidable relative to said flat ratchet plate and said plate-shaped pawl said lower arm being disposed between said flat ratchet plate and said upper arm and having a protection flange along an upper periphery thereof so as to surround a portion of said flat ratchet plate, thereby protecting said toothed edge of said flat ratchet plate, when said toothed edges faces upwardly upon rotation of said flat ratchet plate.

2. The reclining device according to claim 1, wherein said lower arm and said flat set plate respectively have an extension which extends below a lower end of said flat ratchet plate, said extension of said lower arm and said extension of said flat set plate are joined together, and lower ends of said joined extensions form an upper rail of a seat track.

3. The reclining device according to claim 1, wherein said upper end of said flat ratchet plate is connected to said upper arm with a connecting pin such that said connecting pin is slidably inserted into an arc-shaped slot formed in an upper end portion of said lower arm which is disposed between said upper end of said flat ratchet plate and said upper arm, thereby limiting a range of rotation of said flat ratchet plate.

4. The reclining device according to claim 3, wherein an upper end portion of said flat ratchet plate has a configuration capable of covering said arc-shaped slot entirely over said range of rotation of said flat ratchet plate.

5. The reclining device according to claim 1, wherein said flat ratchet plate has an extension which extends above an upper end of said lower arm, and is secured to said upper arm, and said upper arm has an extension which extends towards said shaft adapted to rotatably support said center of said flat ratchet plate, and a lower end of said extension of said upper arm is rotatably supported by said shaft.

6. The reclining device according to claim 1, wherein an upper end portion of said lower arm is disposed between said flat ratchet plate and said upper arm which are secured to each other, and said protection flange has a width greater than the thickness of said flat ratchet plate so as to cover said upper end of said flat ratchet plate.

* * * * *